United States Patent
Dickel

(10) Patent No.: US 12,416,342 B2
(45) Date of Patent: Sep. 16, 2025

(54) FAILSAFE PISTON PRESSURE PATH

(71) Applicant: Goodrich Corporation, Charlotte, NC (US)

(72) Inventor: Jacob Allen Dickel, New Vienna, OH (US)

(73) Assignee: Goodrich Corporation, Charlotte, NC (US)

( * ) Notice: Subject to any disclaimer, the term of this patent is extended or adjusted under 35 U.S.C. 154(b) by 642 days.

(21) Appl. No.: 17/856,358

(22) Filed: Jul. 1, 2022

(65) Prior Publication Data

US 2024/0003395 A1    Jan. 4, 2024

(51) Int. Cl.
| | |
|---|---|
| *F16D 65/84* | (2006.01) |
| *B64C 25/44* | (2006.01) |
| *F16D 65/18* | (2006.01) |
| *F16D 65/78* | (2006.01) |
| *F16D 121/04* | (2012.01) |
| *F16D 125/06* | (2012.01) |
| *F16D 125/58* | (2012.01) |

(52) U.S. Cl.
CPC ............... *F16D 65/84* (2013.01); *B64C 25/44* (2013.01); *F16D 65/18* (2013.01); *F16D 2065/785* (2013.01); *F16D 2121/04* (2013.01); *F16D 2125/06* (2013.01); *F16D 2125/582* (2013.01)

(58) Field of Classification Search
None
See application file for complete search history.

(56) References Cited

U.S. PATENT DOCUMENTS

| | | | |
|---|---|---|---|
| 5,205,382 A * | 4/1993 | Edmisten | F16D 65/84 188/196 R |
| 5,538,109 A * | 7/1996 | Swank | F16D 55/40 188/71.6 |
| 2005/0194220 A1* | 9/2005 | Edmisten | F16D 55/40 188/71.5 |
| 2013/0240304 A1 | 9/2013 | McCaffrey | |
| 2020/0049216 A1* | 2/2020 | Herrmann | F16D 55/36 |
| 2020/0325948 A1* | 10/2020 | Todd | B64C 25/34 |

FOREIGN PATENT DOCUMENTS

| | | |
|---|---|---|
| CN | 106114827 | 11/2016 |
| DE | 3742237 | 10/1988 |
| EP | 3611396 | 2/2020 |

OTHER PUBLICATIONS

European Patent Office, European Search Report dated Dec. 5, 2023 in Application No. 23182530.8.

* cited by examiner

*Primary Examiner* — Melanie Torres Williams
(74) *Attorney, Agent, or Firm* — SNELL & WILMER L.L.P.

(57) ABSTRACT

A piston assembly is disclosed herein. The piston assembly includes a piston having a first end, an opposing second end, and a sidewall extending from the first end to the second end, the piston further including a cavity at least partially defined by the sidewall, a spring guide having a first end and an opposing second end, the spring guide disposed within the cavity of the piston and adjacent the sidewall, an insulator having a first portion extending from the second end of the piston and a second portion disposed within the piston, an insulator shield disposed adjacent the first portion of the insulator, and a component coupled to the second end of the spring guide, the component being offset from the insulator shield by a distance.

20 Claims, 6 Drawing Sheets

FAILSAFE PISTON PRESSURE PATH

FIELD

The present disclosure generally relates brake assemblies and more specifically to piston assemblies within brake assemblies.

BACKGROUND

During a hot brake rejected takeoff, the heat sink of a wheel and brake assembly tends to get extremely hot. Brake assembly parts that are in contact with the heat sink of the brake assembly may also get extremely hot and may lose their structural integrity. This may cause components to fail in response to the excessive heat in the brake assembly. For example, the piston assembly, as part of the brake assembly, may fail due to the heat transferred from the heat sink. There are requirements to maintain a static torque on the brake assembly which entails braking pressure to be applied to the heat sink even when the brake assembly is overheating.

SUMMARY

A piston assembly is disclosed herein. The piston assembly includes a piston having a first end, an opposing second end, and a sidewall extending from the first end to the second end, the piston further including a cavity at least partially defined by the sidewall, a spring guide having a first end and an opposing second end, the spring guide disposed within the cavity of the piston and adjacent the sidewall, an insulator having a first portion extending from the second end of the piston and a second portion disposed within the piston, an insulator shield disposed adjacent the first portion of the insulator, and a component coupled to the second end of the spring guide, the component being offset from the insulator shield by a distance.

In various embodiments, the insulator is a first insulator and the piston assembly further includes a second insulator disposed adjacent the second end of the first insulator, wherein the insulator shield includes an opening through which the second insulator extends. In various embodiments, the component is a first component and the piston assembly further includes a second component disposed between the first end of the spring guide and the first end of the piston and coupled to the sidewall of the piston, the second component configured to provide support to the spring guide. In various embodiments, the second component comprises a high temperature capable insulator material.

In various embodiments, the component comprises a high temperature capable insulator material. In various embodiments, the component is press fit onto the second end of the spring guide. In various embodiments, the piston assembly further includes a spring disposed between the first end of the spring guide and the first end of the piston, a lock ring disposed in the sidewall of the piston and configured to prevent the spring guide from extending out of the second end of the piston, and an insulator support disposed within the piston and configured to secure the insulator to the piston.

Also disclosed herein is a brake assembly. The brake assembly includes a plurality of stator disks, a plurality of rotor disks interleaved with the plurality of stator disks, a pressure plate disposed adjacent one of the plurality of rotor disks, and a piston assembly disposed adjacent the pressure plate. The piston assembly includes a piston having a first end, an opposing second end, and a sidewall extending from the first end to the second end, the sidewall at least partially defining a cavity, a spring guide having a first end and an opposing second end, the spring guide disposed within the cavity of the piston and adjacent the sidewall, an insulator having a first portion extending from the second end of the piston and a second portion disposed within the piston, an insulator shield disposed adjacent the first portion of the insulator adjacent the pressure plate, and a component coupled to the second end of the spring guide, the component being spaced from the insulator shield by a distance.

In various embodiments, the insulator is a first insulator and the piston assembly further includes a second insulator disposed adjacent the second end of the first insulator, wherein the insulator shield includes an opening through which the second insulator extends. In various embodiments, the second insulator is configured to engage the pressure plate to apply a braking force. In various embodiments, the component is a first component and the piston assembly further includes a second component disposed between the first end of the spring guide and the first end of the piston and coupled to the sidewall of the piston, the second component configured to provide support to the spring guide.

In various embodiments, the second component comprises a high temperature capable insulator material. In various embodiments, the component comprises a high temperature capable insulator material. In various embodiments, the component is threaded onto the second end of the spring guide. In various embodiments, the component is press fit onto the second end of the spring guide. In various embodiments, the piston assembly further includes a spring disposed between the first end of the spring guide and the first end of the piston, a lock ring disposed in the sidewall of the piston and configured to prevent the spring guide from extending out of the second end of the piston, and an insulator support disposed within the piston and configured to secure the insulator to the piston.

In various embodiments, the insulator shield is configured to engage the pressure plate to apply a braking force. In various embodiments, the component is configured to engage the pressure plate in response to the insulator shield collapsing.

Also disclosed herein is a piston assembly. The piston assembly includes a hollow cylindrical piston having a first end and an opposing second end, a spring guide having a first end and an opposing second end disposed within the hollow cylindrical piston, a component coupled to the second end of the spring guide, an insulator coupled to the second end of the hollow cylindrical piston, the insulator offset from the component by a first distance, and an insulator shield coupled to the insulator and offset from the component by a second distance.

In various embodiments, the piston assembly further includes a second insulator coupled to the insulator and offset from the component by a third distance and a second component coupled to the piston and configured to provide support for the spring guide.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
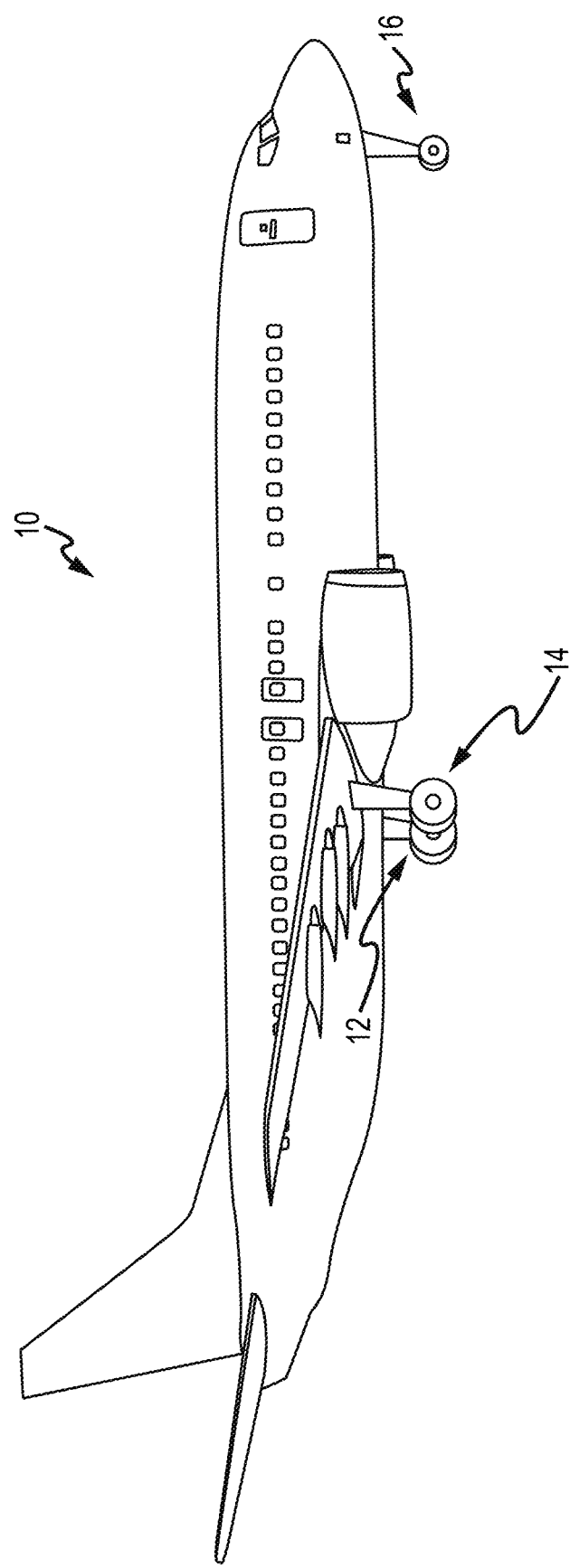
FIG. 1A illustrates an exemplary aircraft having a brake system, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

The brake assembly, and more specifically, the piston assembly disclosed herein maintains brake pressure longer during a hot brake rejected take off (HBRTO) while retaining structural strength of the piston assembly. For most braking applications, it is beneficial to reduce the number of contacts that allow heat transfer into the piston including into the piston housing and/or hydraulic fluid. Therefore, an additional path for all braking applications is not desirable. In various embodiments, an additional part and/or feature is added to the piston assembly to act as a secondary load path for applying brake pressure to the heat sink in the event that the primary load path fails due to excessive heat. For example, as the piston assembly heats up, the piston assembly may collapse or mushroom in response to being in contact with an overheated heat sink. The piston assembly may transfer brake pressure to the insulator of the piston assembly in response to the collapse or mushroom. In various embodiments, the additional part and/or feature provide a secondary contact point for when the primary piston contact fails to a certain degree and may allow the piston to retain some stroke and keep the brake pressure applied to the heat sink. In various embodiments, the secondary load path may apply brake pressure directly to the heat sink.

In various embodiments, the secondary load path bypasses the main forms of failure in the primary path to ensure that brake pressure is maintained. In various embodiments, the secondary load path does not contact the hotter portion of the primary path until the primary path beings to fail in response to high temperature load. In various embodiments, the secondary load path allows for minimal piston collapse and continued brake application during HBRTO with little to no affect to the heat transfer for other stopping conditions. In various embodiments, this may allow for cheaper, lighter, and/or weaker materials to be used for the piston and/or piston insulator for normal stopping conditions while still meeting HBRTO standards using the secondary load path.

Referring to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just referred, the disclosure nevertheless contemplates any number of landing gear configurations.

Figure 1B:
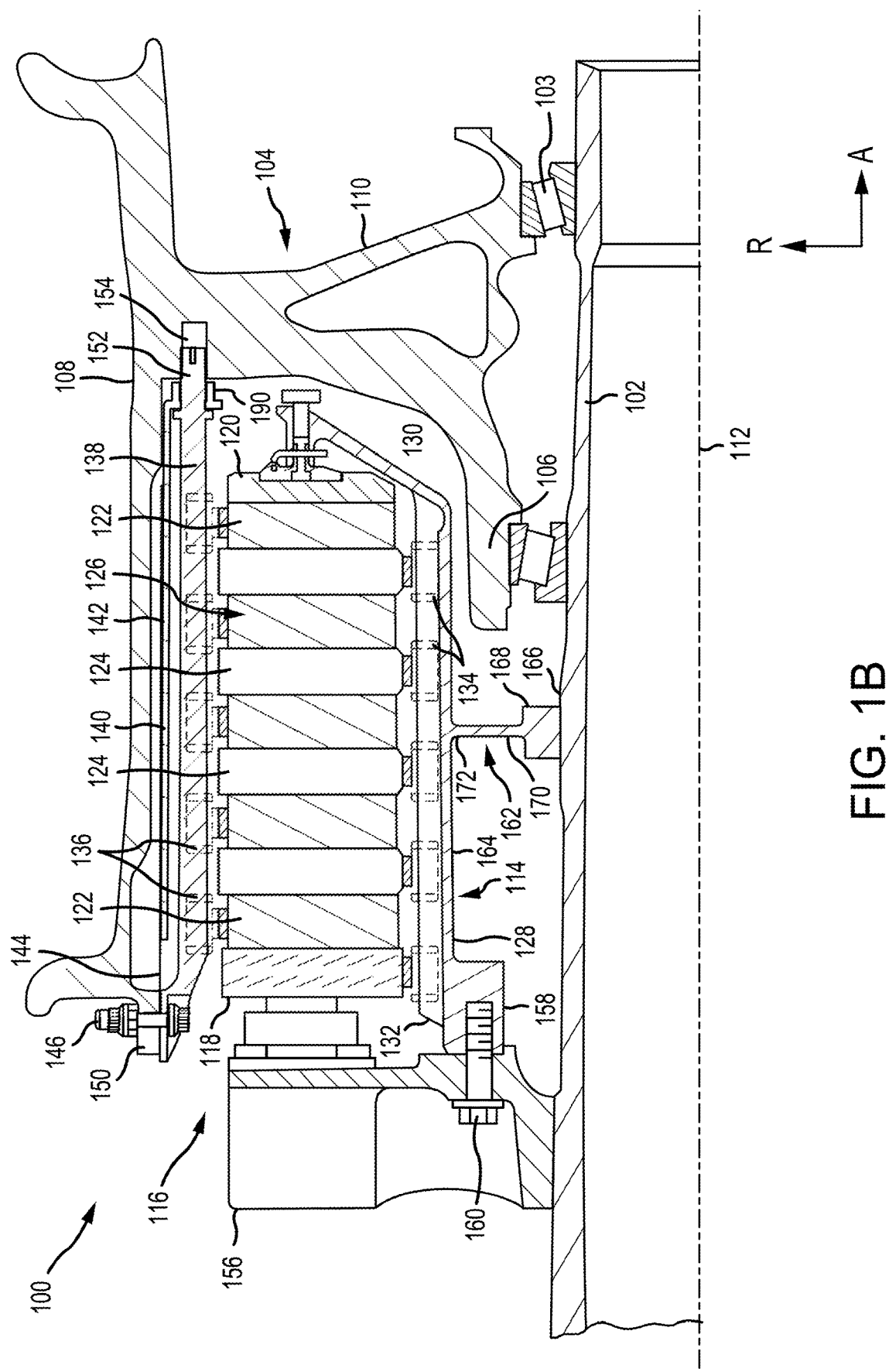
FIG. 1B illustrates a cross-sectional view of a brake assembly, in accordance with various embodiments.

Referring now to FIG. 1B, there is schematically depicted a brake mechanism (or brake assembly) 100 that may be used by the aircraft 10 of FIG. 1A or any other appropriate aircraft. The brake mechanism 100 is mounted on an axle 102 for use with a wheel 104 disposed on and configured to rotate about the axle 102 via one or more bearing assemblies 103. The wheel 104 includes a hub 106, a wheel well 108 concentric about the hub 106 and a web portion 110 interconnecting the hub 106 and the wheel well 108. A central axis 112 extends through the axle 102 and defines a center of rotation of the wheel 104. A torque plate barrel 114 (sometimes referred to as a torque tube or barrel or a torque plate or back leg) is aligned concentrically with the hub 106, and the wheel 104 is rotatable relative to the torque plate barrel 114.

The brake mechanism 100 includes a piston assembly 116, a pressure plate 118 disposed adjacent the piston assembly 116, an end plate 120 positioned a distal location from the piston assembly 116, and a plurality of rotor disks 122 interleaved with a plurality of stator disks 124 positioned intermediate the pressure plate 118 and the end plate 120. The pressure plate 118, the plurality of rotor disks 122, the plurality of stator disks 124 and the end plate 120 together form a brake heat sink or brake stack 126. The pressure plate 118, the end plate 120 and the plurality of stator disks 124 are mounted to the torque plate barrel 114 and remain rotationally stationary relative to the axle 102.

The torque plate barrel 114 may include an annular barrel or torque tube 128 and an annular plate or back leg 130. The back leg 130 is disposed at an end distal from the piston assembly 116 and may be made monolithic with the torque tube 128, as illustrated in FIG. 1B, or may be made as a separate annular piece and suitably connected to the torque tube 128. The torque tube 128 has a plurality of circumferentially spaced and axially extending splines 132 disposed on an outer surface of the torque tube 128. The plurality of stator disks 124 and the pressure plate 118 include notches or stator slots 134 on an inner periphery of the disks and the plate for engagement with the splines 132, such that each disk and the plate are axially slidable with respect to the torque tube 128.

The end plate 120 is suitably connected to the back leg 130 of the torque plate barrel 114 and is held non-rotatable, together with the plurality of stator disks 124 and the pressure plate 118, during a braking action. The plurality of rotor disks 122, interleaved between the pressure plate 118, the end plate 120 and the plurality of stator disks 124, each have a plurality of circumferentially spaced notches or rotor lugs 136 along an outer periphery of each disk for engagement with a plurality of torque bars 138 that is secured to or made monolithic with an inner periphery of the wheel 104.

An actuating mechanism for the brake mechanism 100 includes a plurality of piston assemblies, including the piston assembly 116, circumferentially spaced around an annular piston housing 156 (only one piston assembly is illustrated in FIG. 1B). Upon actuation, the plurality of piston assemblies affect a braking action by urging the pressure plate 118 and the plurality of stator disks 124 into frictional engagement with the plurality of rotor disks 122 and against the end plate 120. Fluid or hydraulic pressure, mechanical springs or electric actuators, among other mechanisms, may be used to actuate the plurality of piston assemblies. Through compression of the plurality of rotor disks 122 and the plurality of stator disks 124 between the pressure plate 118 and the end plate 120, the resulting frictional contact slows or stops or otherwise prevents rotation of the wheel 104. The plurality of rotor disks 122 and the plurality of stator disks 124 are fabricated from various materials, such as ceramic matrix composites, that enable the brake disks to withstand and dissipate the heat generated during and following a braking action.

The torque plate barrel 114 is secured to a stationary portion of the landing gear such as the axle 102, preventing the torque plate barrel 114 and the plurality of stator disks 124 from rotating during braking of the aircraft. The torque tube 128 portion of the torque plate barrel 114 may be attached to the annular piston housing 156 via an annular mounting surface 158, wherein bolt fasteners 160 secure the torque plate barrel 114 to the annular piston housing 156. A spacer member or pedestal 162 is positioned between an inner diameter surface 164 of the torque tube 128 and an outer diameter surface 166 of the axle 102. The pedestal 162 includes a radially inner surface or foot 168 for engaging the axle 102, a web portion 170 radially outward of the foot 168 and a head portion 172 for engaging the inner diameter surface 164 of the torque tube 128. The pedestal 162 augments support of the torque plate barrel 114 within the brake mechanism 100 generally and, more particularly, against the axle 102. The pedestal 162 may be made monolithic with the torque tube 128 portion of the torque plate barrel 114.

A heat shield 140 is secured directly or indirectly to the wheel 104 between a radially inward surface of the wheel well 108 and the plurality of torque bars 138. As illustrated in FIG. 1B, the heat shield 140 is concentric with the wheel well 108 and may have a plurality of heat shield sections 142 disposed between respective, adjacent pairs of the plurality of torque bars 138. The heat shield 140, or heat shield sections 142, is spaced from the radially inward surface of the wheel well 108 and secured in place by heat shield tabs 190, such that the heat shield 140, or heat shield sections 142, is disposed generally parallel to the axis of rotation or central axis 112 of the wheel 104 and intermediate the plurality of torque bars 138 and the radially inward surface of the wheel well 108. In various embodiments, including for heavy-duty applications, the heat shield 140, or heat shield sections 142, may be further secured in place by heat shield carriers 144.

The plurality of torque bars 138 is attached at axially inboard ends to the wheel 104 by torque bar bolts 146. The torque bar bolts 146 extend through respective holes in a flange 150 provided on the wheel 104 as shown, which flange 150 for purposes of the present description is intended to be considered as part of the wheel well 108. Each of the plurality of torque bars 138 may include a pin 152 or similar member at its axially outboard end (i.e., the end opposite the torque bar bolts 146) that is received within a hole 154 disposed proximate the web portion 110 of the wheel 104. The heat shield 140, or heat shield sections 142, is positioned adjacent a radially inward surface of the wheel well 108 and secured in place by the heat shield tabs 190.

Figure 2:
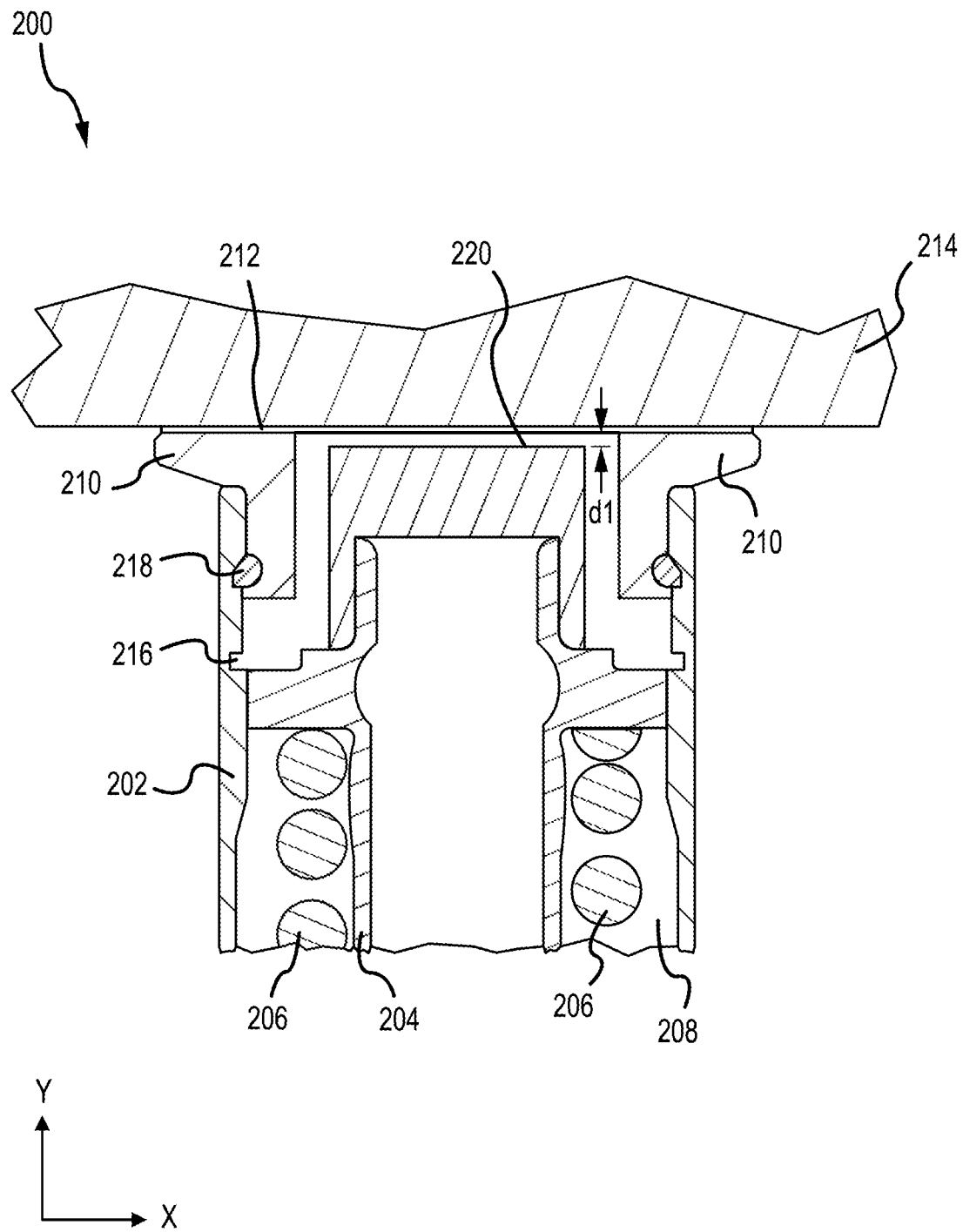
FIG. 2 illustrates a cross-sectional view of a piston for use in a brake assembly, in accordance with various embodiments.

Referring now to FIG. 2, in accordance with various embodiments, a cross-section of a piston assembly 200 is illustrated. In various embodiments, piston assembly 200 may be an example of piston assembly 116 described above with respect to FIG. 1B. Piston assembly 200 includes a piston 202, a spring guide 204, a spring 206, an air gap 208, an insulator 210, and an insulator shield 212. Piston 202 is cylindrical having a hollow center cavity (e.g., air gap 208) that is partially defined by side walls of piston 202. Piston 202 extends from a piston housing and engages a heat sink 214. As piston 202 engages, and presses into (e.g., the y-direction), heat sink 214 a brake force is applied to the brake assembly (e.g., brake assembly 100). In various embodiments, heat sink 214 may be an example of pressure plate 118 described above with respect to FIG. 1B. In various embodiments, heat sink 214 may be an outer stator, an end board side of a heat sink, or a stator exposed toward the piston, among others. As heat sink 214 wears down and/or heats up, piston 202 extends further from a piston housing (e.g., in the y-direction). The extension of piston 202 from the piston housing may be called the stroke of the piston. In various embodiments, a warm piston may extend, or have a stroke of, about 5 mm to about 30 mm out the piston housing, and more specifically, about 10 mm to about 20 mm. Generally, as the brakes wear out and warm up during use, piston 202 may extend further from the housing, using more of the available stroke. After a certain stroke (e.g., 20 mm) piston 202 cannot extend further, resulting in reduced braking pressure.

Spring guide 204 and spring 206 are disposed within piston 202, and more specifically within air gap 208, and provide additional support for piston 202. In various embodiments, spring guide 204 and spring 206 provide a buffer, or dampener, for piston 202 if an opposing force is exerted, such as by heat sink 214, through movement within the brake assembly (e.g., brake assembly 100). This allows piston 202 to maintain contact with heat sink 214 and provide a consistent brake pressure. Piston assembly 200 further includes a lock ring 216 disposed within piston 202. In various embodiments, lock ring 216 may be an indent around the circumference of piston 202. Lock ring 216 may be configured to receive, or seat, an O-ring that secures spring guide 204 in place and prevents spring guide 204 from extending further past lock ring 216 (e.g., in the y-direction).

Insulator 210 is coupled to an end of piston 202, as illustrated it is the upper end (e.g., in the y-direction). There is an air gap between insulator 210 and spring guide 204 which provides a thermal barrier to reduce the amount of heat transferred from insulator 210 to spring guide 204 during operation. Insulator 210 is secured to piston 202 by an insulator support 218 that is formed within piston 202. Insulator support 218 prevents insulator 210 from extending past piston 202 (e.g., the y-direction). Insulator 210 has a mushroom shape, with one end of insulator 210 being within piston 202 and the other end of insulator 210 extending past piston 202 and over piston 202. This provides support for insulator 210 to not be pressed into piston 202 (e.g., the negative y-direction). Insulator 210 is typically made from a high temperature capable insulator material. In various embodiments, insulator 210 may be made from steel, austenitic nickel-chromium-based superalloys such as those sold under the name INCONEL (IN-100 and the like), or another high temperature capable material. That is, a material that is able to maintain structural strength while being subjected to high temperatures.

Insulator shield 212 is coupled to the side of insulator 210 that is facing away from piston 202 (e.g., the y-direction). Insulator shield 210 provides the contact surface for piston assembly 200 to heat sink 214. Insulator shield 212 is made from a high temperature capable insulator material. In various embodiments, insulator shield 212 may be made from steel, austenitic nickel-chromium-based superalloys such as those sold under the name INCONEL(IN-100), or another high temperature capable material.

Combined, insulator 210 and insulator shield 212 form the primary load path of piston assembly 200. The force exerted by piston assembly 200 passes through insulator 210 and insulator shield 212. As a result, the high temperatures from heat sink 214 are passed to insulator 210 through insulator shield 212. Generally, insulator 210 and insulator shield 212 are capable handling the high temperatures achieved during braking. However, during a hot brake rejected take off (HBRTO) the temperatures within the brake assembly (e.g., brake assembly 100) and of heat sink 214 may exceed tolerances of piston assembly 200, specifically, insulator 210 and insulator 212. This may cause insulator 210 and/or insulator shield 212 to break down, collapse, and/or mushroom in response to the sustained high temperatures. This decreases the effectiveness of the primary load path (e.g., insulator 210 and insulator shield 212) and may result in brake failure.

With continued reference to FIG. 2, piston assembly 200 further includes a component 220 that acts as a secondary load path. Component 220 is disposed between spring guide 204 and insulator shield 212. Component 220 is coupled to spring guide 204, surrounding an end of spring guide 204. There is an air gap between component 220 and insulator 210 and between component 220 and insulator shield 212. The air gap provides a thermal barrier between component 220 and both insulator 210 and insulator shield 212 to reduce the amount of heat introduced into piston assembly 200. Component 220 is separated from insulator shield 212 by a distance d1. In various embodiments, distance d1 may be about 0.1 mm to about 1 mm. Distance d1 provides physical and thermal separation between insulator shield 212 and component 220. Insulator 210 supports insulator shield 212 and creates distance d1.

Component 220 relieves some of the stress experienced by piston assembly 200 in response to piston assembly 200 being exposed to high temperatures, such as during HBRTO. During a hot brake rejected take off (HBRTO) the temperature of the brake assembly (e.g., brake assembly 100) increases from the friction used during braking. The heat from the brake assembly, including heat sink 214, is transferred to piston assembly 200. The increased temperature causes the breakdown of insulator 210 and/or insulator shield 212 and the collapse of piston assembly 200. Specifically, insulator shield 212 may collapses as insulator 210 collapses. Distance d1 is decreased as insulator shield 212 collapses until insulator shield 212 contacts and engages component 220. Component 220 is cooler than the surrounding insulator 210 and insulator shield 212 because of the air gap of distance d1.

In various embodiments, component 220 may be press fit onto spring guide 204. In various embodiments, component 220 may be threaded and may be threaded onto spring guide 204. In various embodiments, spring guide 204 may include a bulge, or other protrusion, over which component 220 fits to press fit, or snap, component 220 into place. In various embodiments, a clip may be used that is deformed slightly as component 220 is pressed onto spring guide 204. The clip then returns to its original shape, securing component 220 to spring guide 204.

Including component 220 in piston assembly 200 allows piston assembly, and thereby the brake assembly (e.g., brake assembly 100) to maintain brake pressure longer during a HBRTO. Component 220 allows for minimal collapse of piston assembly 200 while maintaining brake pressure with little to no additional heat transfer during other braking, or stopping, conditions. The minimal collapse of piston assembly 200 and subsequent support by component 220 provides additional braking time for the braking assembly (e.g., brake assembly 100). Additionally, the use of component 220 as a secondary load path may allow for the use of cheaper, lighter, and/or weaker materials for piston 202, insulator 210, and/or insulator shield 212 while still meeting braking requirements.

Figure 3:
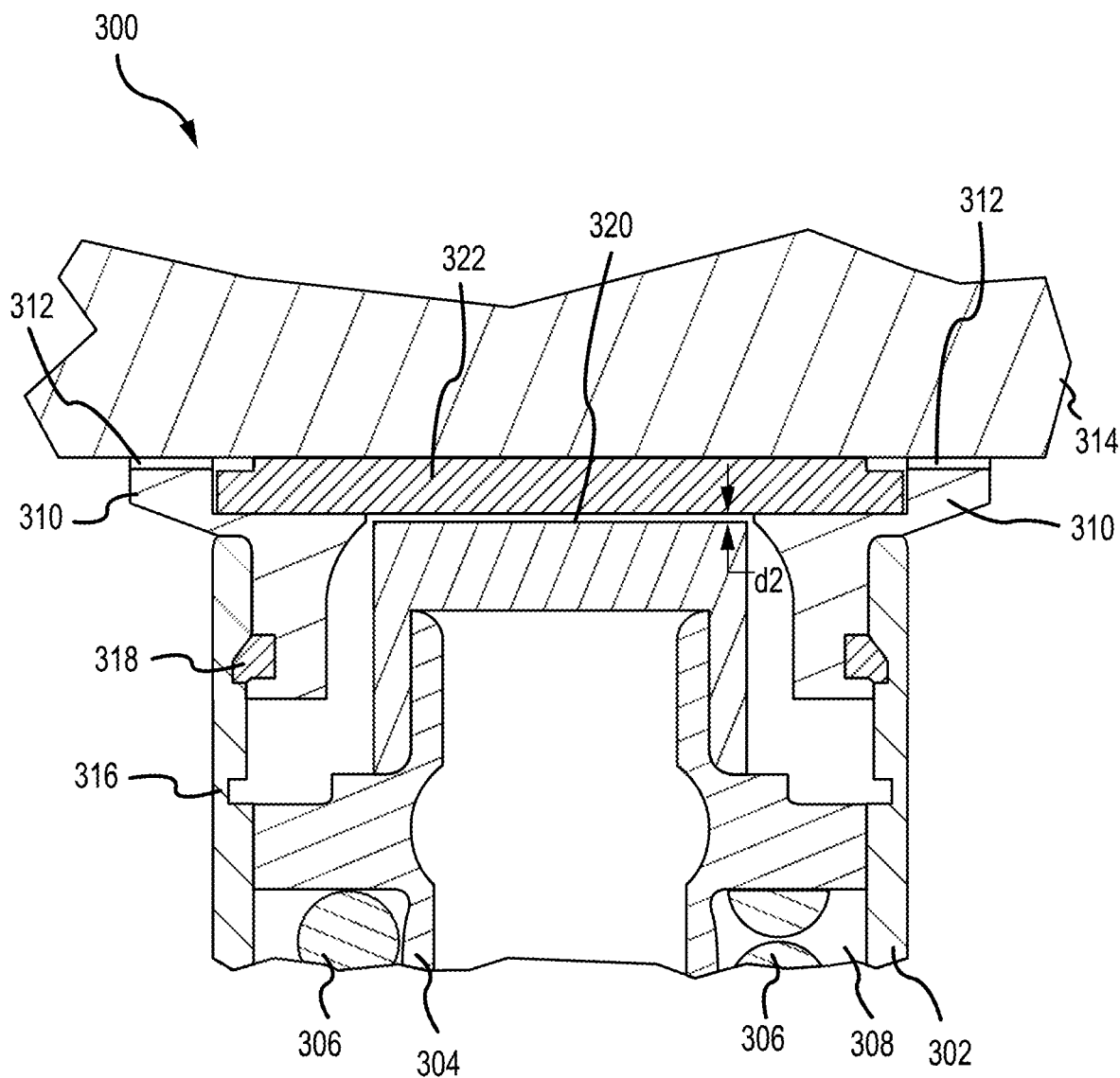
FIG. 3 illustrates a cross-sectional view of a piston for use in a brake assembly, in accordance with various embodiments.

Referring now to FIG. 3, in accordance with various embodiments, a cross-section of a piston assembly 300 is illustrated. Piston assembly 300 includes similar components to those described above with respect to piston assembly 200 in FIG. 2, including a piston 302, a spring guide 304, a spring 306, a spring sleeve 308, a first insulator 310, an insulator shield 312, a lock ring 316, an insulator support 318, and a component 320. Piston assembly 300 further includes a second insulator 322 that is located between component 320 and insulator shield 312. Various features and components of piston assembly 300 are described above with respect to piston assembly 200 and FIG. 2 which may not be repeated here.

Second insulator 322 is made from a high temperature capable insulator material. In various embodiments, second insulator 322 may be made from carbon. In various embodiments, second insulator 322 may be made from austenitic nickel-chromium-based superalloys such as those sold under the name INCONEL(IN-100) or another high temperature capable material. In the depicted embodiment, first insulator 310 has a different cross-section than insulator 210 depicted in FIG. 2. The cross-section of first insulator 310 includes a shelf portion 310a upon which second insulator 322 is disposed. Additionally, insulator shield 312 has an annular shape including a central hole, or opening, through which second insulator 322 extends to contact heat shield 314. Insulator shield 312 contacts first insulator 310 but does not contact second insulator 322. In various embodiments, a portion of insulator shield 312 may contact first insulator 310.

There is a distance d2 between second insulator 322 and second load path part 320. Distance d2 provides a thermal barrier between second insulator 322 and second load path part 320 to reduce heat transfer between the two components. In various embodiments, distance d2 may be about 0.1 mm to about 1 mm. In various embodiments distance d2 may be larger or smaller based on piston assembly 300 design. Similar to piston assembly 200 described above with respect to FIG. 2, in the event of high temperatures, such as during a HBRTO event, second insulator 322 and/or first insulator 310 may collapse. Second load path part 320 provides additional support for piston assembly 300 in response to the collapse with little to no additional heat being introduced to piston assembly through second load path part 320.

Figure 4:
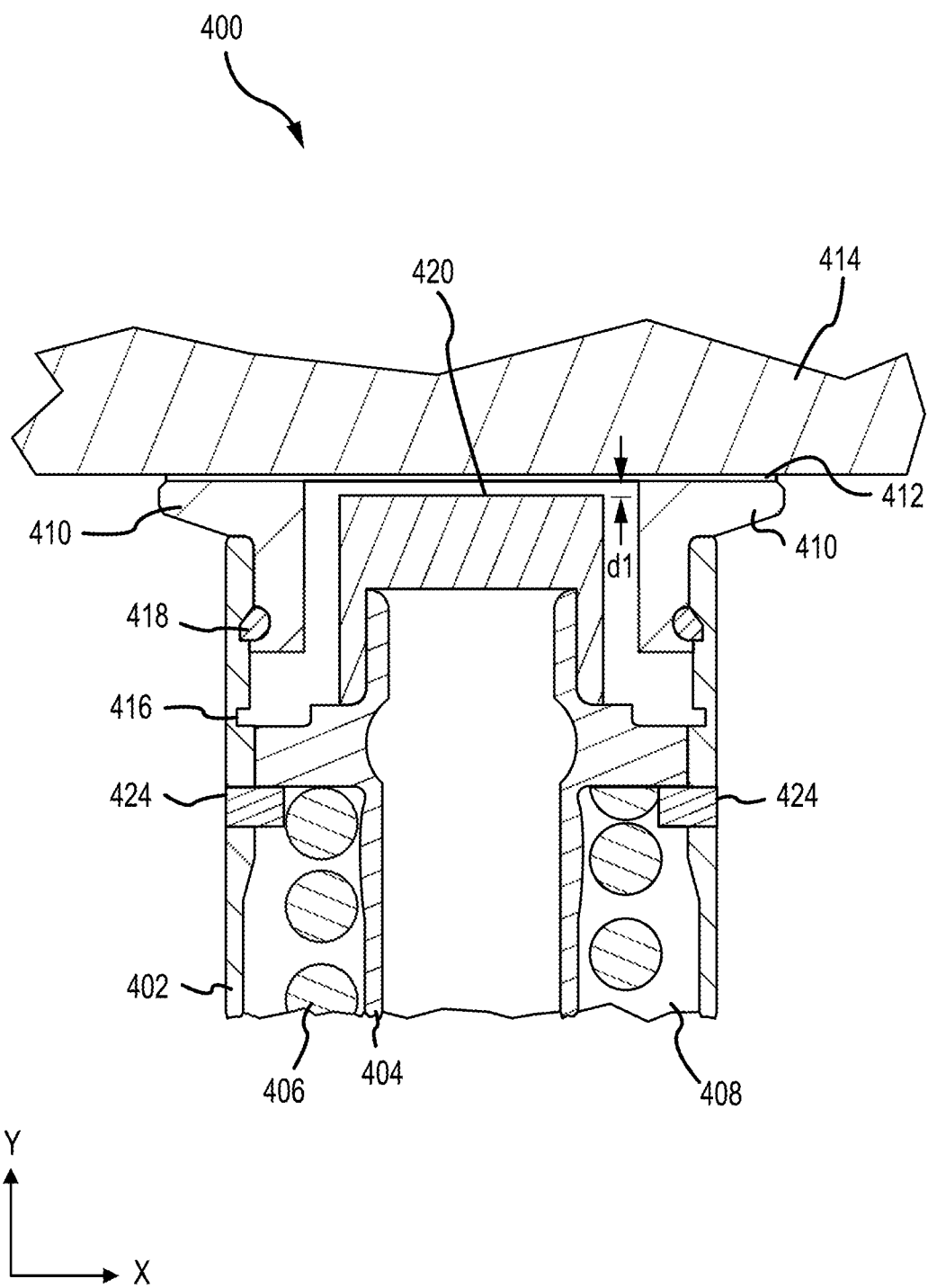
FIG. 4 illustrates a cross-sectional view of a piston for use in a brake assembly, in accordance with various embodiments.

Referring now to FIG. 4, in accordance with various embodiments, a cross-section of a piston assembly 400 is illustrated. Piston assembly 400 includes similar components to those described above with respect to piston assembly 200 in FIG. 2, including a piston 402, a spring guide 404, a spring 406, a spring sleeve 408, an insulator 410, an insulator shield 412, a lock ring 416, an insulator support 418, and a first component 420. Piston assembly 400 further includes a second component 424. Various features and components of piston assembly 300 are described above with respect to piston assembly 200 and FIG. 2 which may not be repeated here.

Second component 424 may be an annular shaped part embedded in piston 402, as illustrated. In various embodiments, second component 424 fits within a channel, or groove, in piston 402. Second component 424 serves as an additional secondary load path to first component 420 by providing additional support for spring guide 406 in response to piston assembly 400 collapsing due to extreme temperatures. As described above, when piston assembly 400 collapses, distance d1 disappears and insulator shield 412 directly contacts first component 420 to maintain braking pressure. The forces on first component 420 are transferred to spring guide 404 which may cause springs 406 to compress thereby reducing braking pressure applied by piston assembly 400. Second component 424 provide additional support to spring guide 404 and spring 406 to prevent compression of spring 406 in a HBRTO event. In various embodiments, spring guide 404 may contact second component 424 prior to first component 420 being engaged. In various, embodiments, there may be an air gap between second component 424 and spring guide 404. The air gap acts as a thermal barrier between second component 424 and spring guide 404, reducing heat transfer. Additionally, the air gap provides space for spring guide 404 to move (e.g., in the y-axis) in response to normal braking condition without engaging second component 424.

Figure 5:
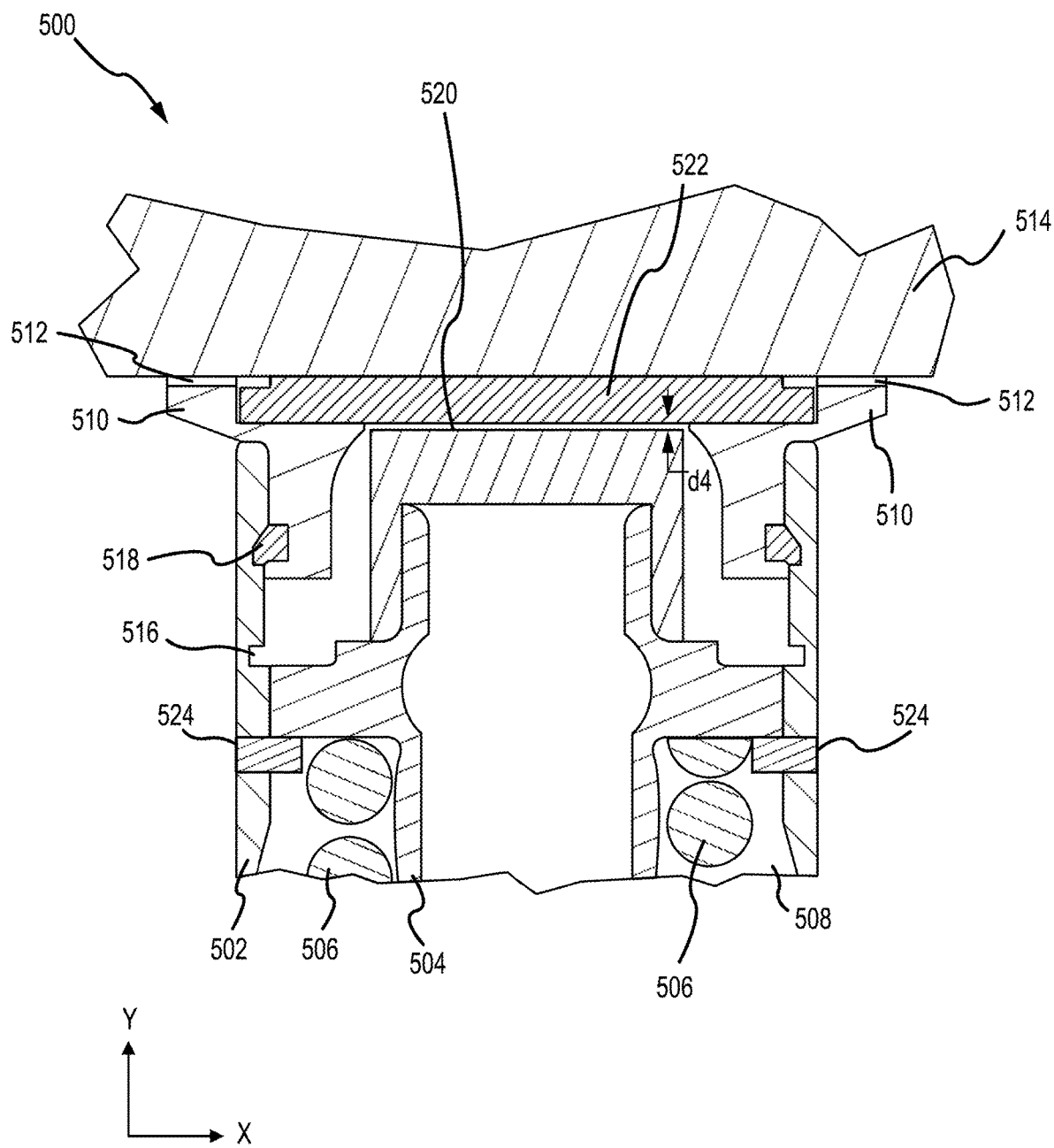
FIG. 5 illustrates a cross-sectional view of a piston for use in a brake assembly, in accordance with various embodiments.

Referring now to FIG. 5, in accordance with various embodiments, a cross-section of a piston assembly 500 is illustrated. Piston assembly 500 includes similar components to those described above with respect to piston assembly 300 in FIG. 3 and piston assembly 400 in FIG. 4, including a piston 502, a spring guide 504, a spring 506, a spring sleeve 508, a first insulator 510, an insulator shield 512, a lock ring 516, an insulator support 518, a first component 520, a second insulator 522, and a second component 524. Various features and components of piston assembly 500 are described above with respect to piston assembly 300 and FIG. 3 and piston assembly 400 in FIG. 4 and may be repeated here.

In the depicted embodiment, piston assembly 500 includes first insulator 510 and second insulator 522 as described above with respect to piston assembly 300 in FIG. 3. Piston assembly 500 further includes first component 520 and second component 524 as described above with respect to piston assembly 400 in FIG. 4. The combination of these components allows piston assembly 500 to maintain brake pressure for a longer period of time during a HBRTO event than would be otherwise possible. This improves the safety of piston assembly 500 and the brake assembly (e.g., brake assembly 100).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A piston assembly, comprising:
   a piston having a first end, an opposing second end, and a sidewall extending from the first end to the second end, the piston further including a cavity at least partially defined by the sidewall;
   a spring guide having a first end and an opposing second end, the spring guide disposed within the cavity of the piston and adjacent the sidewall;
   an insulator having a first portion extending from the second end of the piston and a second portion disposed within the piston;
   an insulator shield disposed adjacent the first portion of the insulator; and
   a component coupled to, surrounding, and enclosing the second end of the spring guide between the spring guide and the insulator shield, the component being offset from the insulator shield by a distance thereby forming an airgap between the component and the insulator shield.

2. The piston assembly of claim 1, wherein the insulator is a first insulator, the piston assembly further comprising:
   a second insulator disposed adjacent the second end of the first insulator, wherein the insulator shield includes an opening through which the second insulator extends.

3. The piston assembly of claim 1, wherein the component is a first component, the piston assembly further comprising:
   a second component disposed between the first end of the spring guide and the first end of the piston and coupled to the sidewall of the piston, the second component configured to provide support to the spring guide.

4. The piston assembly of claim 3, wherein the second component comprises an insulator material.

5. The piston assembly of claim 1, wherein the component comprises an insulator material.

6. The piston assembly of claim 1, wherein the component is press fit onto the second end of the spring guide.

7. The piston assembly of claim 1, further comprising:
   a spring disposed between the first end of the spring guide and the first end of the piston;
   a lock ring disposed in the sidewall of the piston and configured to prevent the spring guide from extending out of the second end of the piston; and
   an insulator support disposed within the piston and configured to secure the insulator to the piston.

8. A brake assembly, comprising:
   a plurality of stator disks;
   a plurality of rotor disks interleaved with the plurality of stator disks;
   a pressure plate disposed adjacent one of the plurality of rotor disks; and
   a piston assembly disposed adjacent the pressure plate, the piston assembly including:
      a piston having a first end, an opposing second end, and a sidewall extending from the first end to the second end, the sidewall at least partially defining a cavity;
      a spring guide having a first end and an opposing second end, the spring guide disposed within the cavity of the piston and adjacent the sidewall;
      an insulator having a first portion extending from the second end of the piston and a second portion disposed within the piston;
      an insulator shield disposed adjacent the first portion of the insulator adjacent the pressure plate; and
      a component coupled to, surrounding, and enclosing the second end of the spring guide between the spring guide and the insulator shield, the component being spaced from the insulator shield by a distance thereby forming an airgap between the component and the insulator shield.

9. The brake assembly of claim 8, wherein the insulator is a first insulator and the piston assembly further comprises:
   a second insulator disposed adjacent the second end of the first insulator, wherein the insulator shield includes an opening through which the second insulator extends.

10. The brake assembly of claim 9, wherein the second insulator is configured to engage the pressure plate to apply a braking force.

11. The brake assembly of claim 8, wherein the component is a first component and the piston assembly further comprises:
    a second component disposed between the first end of the spring guide and the first end of the piston and coupled to the sidewall of the piston, the second component configured to provide support to the spring guide.

12. The brake assembly of claim 11, wherein the second component comprises an insulator material.

13. The brake assembly of claim 8, wherein the component comprises an insulator material.

14. The brake assembly of claim 8, wherein the component is threaded onto the second end of the spring guide.

15. The brake assembly of claim 8, wherein the component is press fit onto the second end of the spring guide.

16. The brake assembly of claim 8, wherein the piston assembly further comprises:
    a spring disposed between the first end of the spring guide and the first end of the piston;
    a lock ring disposed in the sidewall of the piston and configured to prevent the spring guide from extending out of the second end of the piston; and
    an insulator support disposed within the piston and configured to secure the insulator to the piston.

17. The brake assembly of claim 8, wherein the insulator shield is configured to engage the pressure plate to apply a braking force.

18. The brake assembly of claim 8, wherein the component is configured to engage the pressure plate in response to the insulator shield collapsing.

19. A piston assembly, comprising:
    a hollow cylindrical piston having a first end and an opposing second end;

a spring guide having a first end and an opposing second end disposed within the hollow cylindrical piston;

a component coupled to, surrounding, and enclosing the second end of the spring guide;

an insulator coupled to the second end of the hollow cylindrical piston, the insulator offset from the component by a first distance; and an insulator shield coupled to the insulator and offset from the component by a second distance thereby forming an airgap between the component and the insulator shield, wherein the component is disposed between the spring guide and the insulator shield.

20. The piston assembly of claim 19, further comprising:

a second insulator coupled to the insulator and offset from the component by a third distance; and a second component coupled to the piston and configured to provide support for the spring guide.

\* \* \* \* \*